O. SPRECHER.
VALVE CASING CLAMP.
APPLICATION FILED MAR. 11, 1908.
910,024.
Patented Jan. 19, 1909.
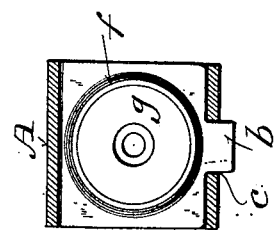
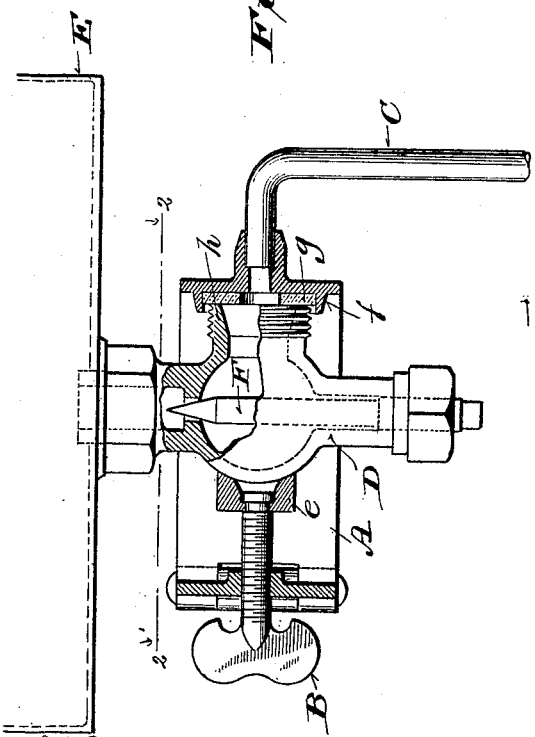
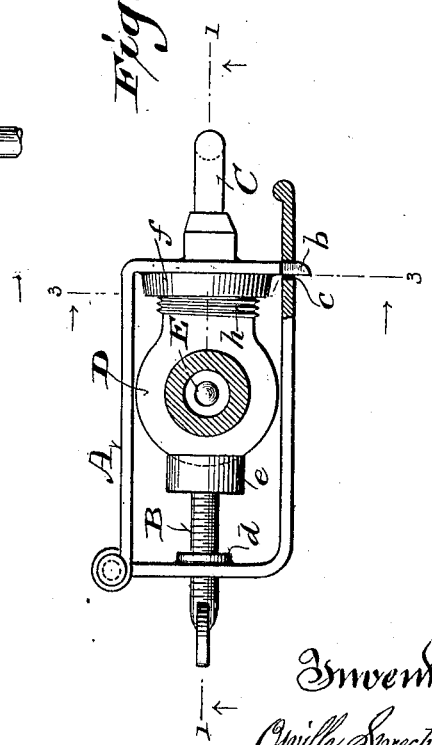

UNITED STATES PATENT OFFICE.

ORVILLE SPRECHER, OF MILWAUKEE, WISCONSIN.

VALVE-CASING CLAMP.

No. 910,024.	Specification of Letters Patent.	Patented Jan. 19, 1909.

Application filed March 11, 1908. Serial No. 420,390.

*To all whom it may concern:*

Be it known that I, ORVILLE SPRECHER, a citizen of the United States, and resident of Milwaukee, in the county of Milwaukee and State of Wisconsin, have invented certain new and useful Improvements in Valve-Casing Clamps; and I do hereby declare that the following is a full, clear, and exact description thereof.

My invention consists in certain peculiarities of construction and combination of parts hereinafter particularly set forth with reference to the accompanying drawings and pointed out in the claims; its object being to provide simple, economical and efficient clamps especially designed for ready, rapid connection and disconnection of the mouths of valve-casings of tanks for acetylene gas or other fluids-under-pressure with a nozzle of a pipe connection with a source of fluid supply.

Figure 1 of the drawings represents a partly sectional elevation of my improved clamp in connection with the valve-casing of a gas-tank, the section being on the plane indicated by line 1—1 in Fig. 2; Fig. 2, a plan view of the same partly in horizontal section on the plane indicated by line 2—2 in Fig. 1, and Fig. 3, a transverse section of the clamp on the plane indicated by line 3—3 in Fig. 1.

Referring by letter to the drawings, A indicates a rectangular frame that comprises two sections in hinge-connection, an end of one section being provided with a centrally projecting tongue $b$ for engagement with a slot $c$ provided in an extended side of the other or swing section of said frame.

One end of the frame is provided with a bearing $d$ for a thumb-screw B, and a set-block $e$ is swiveled on the inner end of the screw. The opposite end of the frame is a nozzle in connection with a pipe C attachable to an outlet from a source of fluid-under-pressure supply, an acetylene-gas storage-tank for instance. This nozzle-end of the frame is provided with an inner annular flange $f$ surrounding a packing-gasket $g$ against which to impinge the mouth $h$ of a valve-casing D in connection with a storage-tank E for said fluid-under-pressure. The joint between the gasket and the mouth of the valve-casing is made tight by running in the screw B, the swiveled set-block $e$ on said screw being concaved to match the opposing convexity of said valve-casing.

In practice, the valve-casing of a storage tank E is engaged by the frame aforesaid to have the mouth $h$ of said casing impinge the packing-gasket $g$ in connection with the nozzle-end of said frame, and the thumb-screw B is run in to clamp the frame on the valve-casing and effect a fluid-tight joint between the casing-mouth and the opposing packing-gasket, after which the tank-valve F, and a valve (not shown) controlling flow from the source of fluid-supply through the pipe C, are opened to effect filling of said tank.

By making the clamp-frame in sections hinged together as herein shown and described, its connection and disconnection with the valve-casing D of a storage tank E is facilitated, and while a thumb-screw has been shown and described as a preferred means for securing said frame and parts therewith in working position with respect to said valve-casing, other means for the same purpose may be substituted without departure from the generic scope of my invention.

I claim:

1. A valve-casing clamp comprising a frame in two sections hinged together, an end of one section being a nozzle for connection with a pipe through which to flow a fluid-under-pressure and provided with a tongue engageable with a slot in a side of the other frame-section; a packing-gasket arranged in connection with the nozzle-end of the frame to oppose the mouth of the valve-casing, and a thumb-screw adjustable in the swing-section of said frame to exert pressure on said valve-casing opposite the nozzle.

2. A valve-casing clamp comprising a frame in two sections hinged together, an end of one section being a nozzle for connection with a pipe through which to flow a fluid-under-pressure and provided with a tongue engageable with a slot in a side of the other frame-section; a packing-gasket arranged in connection with the nozzle-end of the frame to oppose the mouth of the valve-casing, and means in connection with the swing-section of said frame to exert pressure on said valve-casing opposite the nozzle.

3. A valve-casing clamp comprising a frame in two sections hinged together and which have interlocking engagement when the frame is closed, an end of one frame-section being a nozzle for connection with a pipe through which to flow a fluid-underpressure, a packing-gasket arranged in connection with the nozzle-end of the frame to oppose the mouth of the valve-casing, and means in connection with the swing-section of said frame to exert pressure on said valve-casing opposite the nozzle.

In testimony that I claim the foregoing I have hereunto set my hand at Milwaukee in the county of Milwaukee and State of Wisconsin in the presence of two witnesses.

ORVILLE SPRECHER.

Witnesses:
JOHN F. REIFF,
CHAS. T. BRAND.